United States Patent [19]

Eisele et al.

[11] Patent Number: 4,734,671
[45] Date of Patent: Mar. 29, 1988

[54] STRAIN GAGE BEAM HAVING INTEGRAL OVERLOAD PROTECTION

[75] Inventors: Walter H. Eisele, Malibu; Peter C. Tack, Camarillo, both of Calif.

[73] Assignee: Solartron Electronics, Inc., Oxnard, Calif.

[21] Appl. No.: 921,713

[22] Filed: Oct. 22, 1986

[51] Int. Cl.[4] .............................................. G01L 1/22
[52] U.S. Cl. ............................................ 338/4; 338/2
[58] Field of Search ....................................... 338/2–5; 73/862.65, 862.67, 765; 29/610 SG

[56] References Cited

U.S. PATENT DOCUMENTS 3,341,796  9/1967  Eisele ..................................... 338/5
4,322,707  3/1982  Ort ........................................ 338/2
4,331,035  5/1982  Eisele et al. ................... 73/862.67 X Primary Examiner—E. A. Goldberg
Assistant Examiner—M. M. Lateef
Attorney, Agent, or Firm—Dale Gaudier; James M. Heslin; Robert C. Colwell

[57] ABSTRACT

A sensitive deflector beam having an integral deflectable element utilizes an immobilization pin and a limit pin to prevent damage to the deflectable element during fabrication and use. The immobilization pin is inserted through the beam and to the deflectable element to hold the element rigidly in place during fabrication. Thus, relatively rigorous operations such as polishing and circuit deposition may be accomplished without damage to the element.

11 Claims, 7 Drawing Figures

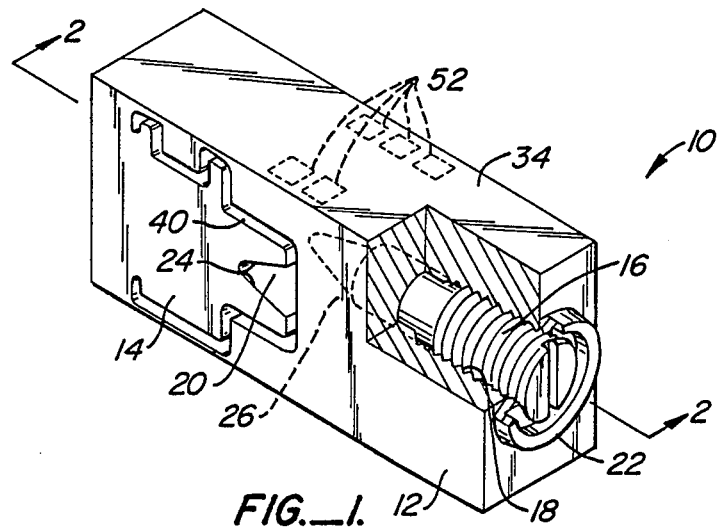
FIG._1.
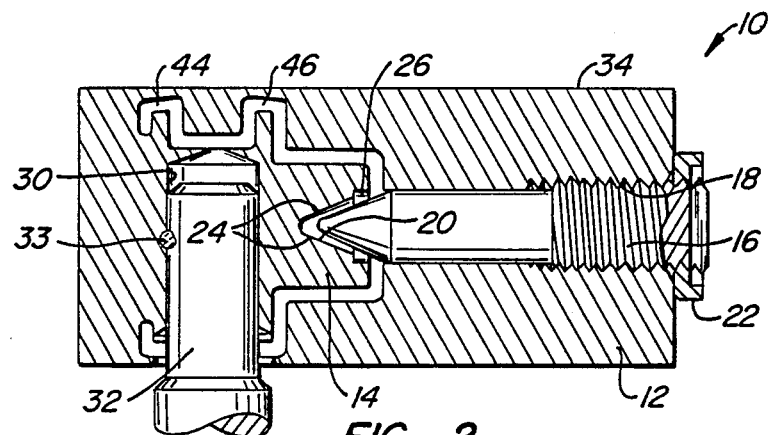
FIG._2.
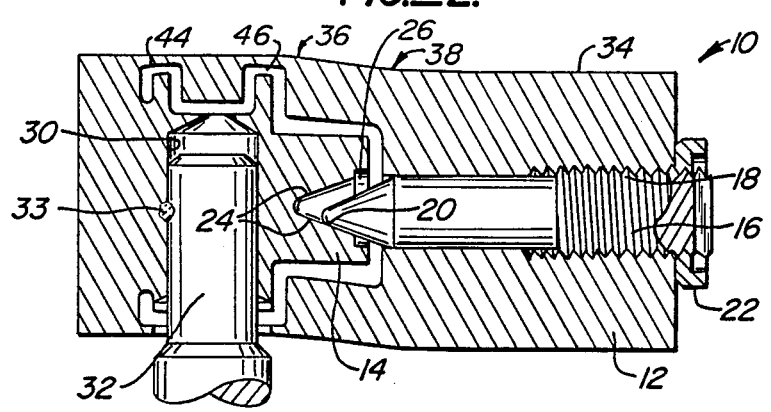
FIG._3.

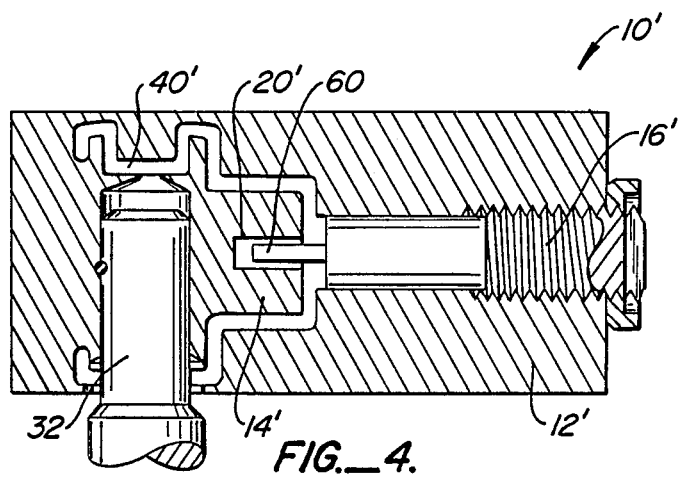
FIG._4.
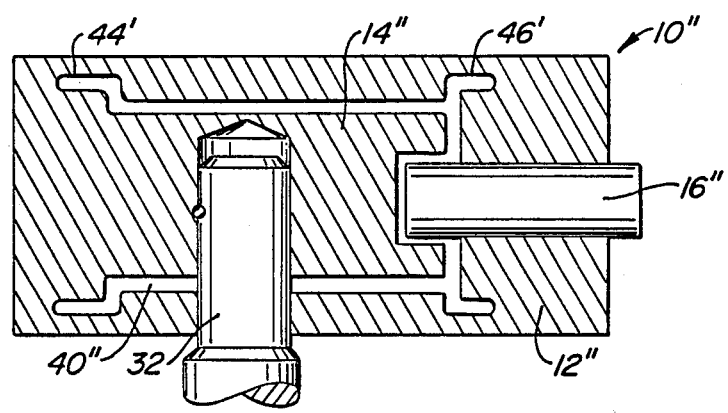
FIG._5.
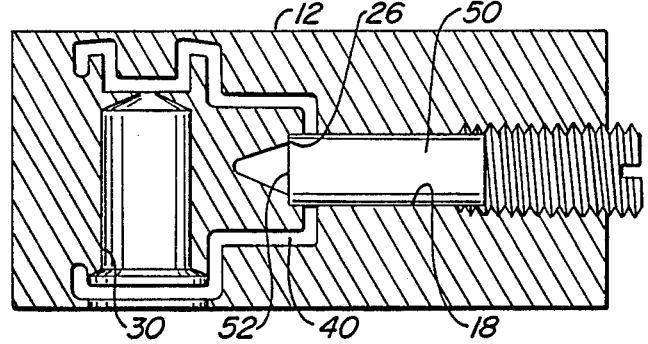
FIG._6.

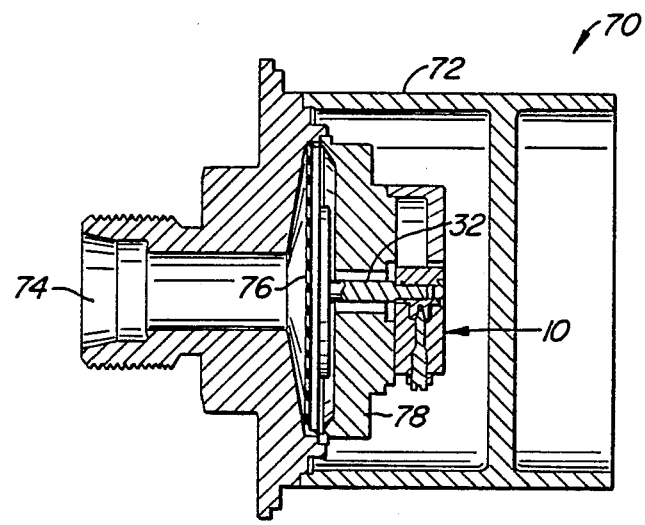
FIG._7.

STRAIN GAGE BEAM HAVING INTEGRAL OVERLOAD PROTECTION

BACKGROUND OF THE INVENTION

1. Field of the Invention

The present invention relates generally to force transducers having a thin film strain gage formed on the surface of a flexural beam, and more particularly, to the construction of a stress reversal beam having an integral limit to prevent excessive travel.

2. Description of the Background Art

Force measurement may be accomplished using a strain gage which converts mechanical motion to an electrical signal. A flexural beam is anchored at one end to a fixed surface and subjected to the force to be measured at the other end. By forming a pattern of resistor elements on the exterior surface of the beam, deformation of the beam as a result of the force can be measured as a function of the change in resistance of the resistor elements as they are stretched or compressed. Commonly, the change in resistance is measured by a Wheatstone bridge circuit, some or all of which may also be formed on the surface of the beam. By mechanically linking the beam to a diaphragm, bellows, or bourdon, pressure measurement can be achieved.

The present invention is concerned with a particular type of strain gage beam referred to as a parallelogram beam and described in U.S. Pat. Nos. 3,341,796 and 4,331,035. The parallelogram beam is designed to create a region of stress reversal intermediate the ends of the beam when the beam is anchored at one end and a force applied near the middle of the beam. In particular, a deflectable element is formed integrally within the beam, which element is connected only to the distal or non-anchored end of the beam. In this way, by applying the force to be measured directly to the deflectable element, an S-shaped or reversing stress is induced in the beam. By placing thin film strain gages on the surface of the beam, particularly at the areas of maximum tension and compression, the flexure of the beam may be measured and related directly to the force applied to the beam.

Although strain gage apparatus employing an integral deflectable element provide more accurate and sensitive force measurement than previously designed beams, the deflectable element is rather fragile and subject to fracture during manufacture and use. Such fragility limits the sensitivity of the gage since a deflectable element and the regions of the beam which undergo stress must be made sufficiently stiff to prevent fracture.

For these reasons, it would be desirable to provide improved parallelogram beam strain gage designs which allow for protection of the integral deflectable element during manufacture and use. In particular, it would be desirable to provide such beams having means for immobilizing the deflectable element during manufacture and for providing variable overload protection for the deflectable element during use.

SUMMARY OF THE INVENTION

According to the present invention, a deflector beam is produced by a method which protects the delicate portions of the beam from damage. The resulting structure also allows for overload protection of the beam during operation. In this way, relatively fragile deflector beams having very high sensitivity may be manufactured and utilized without fear that the beam will be damaged by excessive force. Beams manufactured by the method of the present invention can provide full scale activation with forces below one ounce and a total deflection on the order one one-thousandth of the inch.

The deflector beam of the present invention is a parallelogram beam comprising a block having an integral deflectable element. The deflectable element is a cantilever extending from one end of the block toward the center. A passage formed through the other end of the block is aligned with a notch or receptacle in the deflectable element. By inserting a retaining pin through the passage and into the receptacle, the deflectable element can be immobilized during the remaining fabrication operations, including polishing and formation of the Wheatstone bridge circuitry on the surface of the beam. Additionally, by inserting a limit pin with a preselected clearance with the receptacle, a mechanical stop on the maximum deflection of the deflectable element during use is provided.

In the preferred embodiment, the deflectable element of the beam is attached by a mechanical link to a pressure-sensitive element, such as a diaphragm, bellows, bourdon tube, or the like, to provide a pressure transducer.

BRIEF DESCRIPTION OF THE DRAWINGS

FIG. 1 is a perspective view with a portion broken away of a parallelogram strain gage beam constructed in accordance with the principles of the present invention.

FIG. 2 is a side elevational view of the beam of FIG. 1, shown in section.

FIG. 3 is a view similar to FIG. 2, except that the deflectable element is deflected until it engages the limit pin.

FIG. 4 is a side elevational view of an alternative embodiment of the strain gage deflector beam of the present invention.

FIG. 5 is a second alternative embodiment of the strain gage deflector beam of the present invention.

FIG. 6 is a side elevational view of the beam of FIGS. 1–3 having the immobilization pin inserted during fabrication.

FIG. 7 is a side elevational view of a pressure transducer employing the strain gage beam deflector of the present invention, shown in section.

DESCRIPTION OF THE PREFERRED EMBODIMENTS

Referring now to FIGS. 1–3, a deflector beam 10 constructed in accordance with the principles of the present invention will be described in detail. The deflector beam 10 comprises a metal block 12 having a deflectable element 14 formed integrally therein. A limit pin 16 is received in an axial passage 18 formed in the block 12. The axial passage 18 extends from one end of the block 12 to the distal end of the deflectable element 14 and is generally aligned with a receptacle or notch 20 formed in the element 14. The axial passage 18 is threaded, and limit pin 16 has a threaded shank so that the pin may be axially translated by turning. Conveniently, a lock nut 22 may be used to secure the pin in a desired position.

Receptacle 20 includes a pair of converging walls 24 and an annular shoulder 26. Limit pin 16 has a conical head conforming to the shape of converging walls 24. When fully translated to the left (not illustrated), the pin 16 engages the walls of receptacle 20, preventing movement of deflectable element 14. As the pin is moved axially to the right, however, an increasingly large gap between walls 24 and the conical head of pin 16 occurs. By properly selecting the axial position of the pin 16, therefore, it is possible to fix a precise limit on the lateral deflection of element 14.

Referring in particular to FIGS. 2 and 3, deflectable element 14 has a transverse passage 30 formed therein. Passage 30 receives link pin 32 which in turn is connected to a force-producing element, such as a diaphragm, bellows, bourdon tube, or the like. Force pin 32 is secured to deflectable element 14 by any convenient method, typically by an electron beam weld 33, and exerts a lateral force on the deflectable element 14, causing a lateral deflection as illustrated in FIG. 3. Such deflection, in turn, causes deformation of upper beam surface 34, particularly causing regions of maximum tension at location 36 (FIG. 3) and maximum compression at location 38. The use of such deflectable elements to cause a stress reversal in a deflector beam is well known in the art and described in U.S. Pat. Nos. 3,341,796 and 4,331,035, the disclosures of which are incorporated herein by reference. The precise areas where the stress reversals occur are determined by the profile of cut 40 which defines the deflectable element 14, as will be described in more detail hereinbelow.

Beam 10 is fabricated from metal bar stock, typically a stainless steel such as 15–5 PH or 17–4 PH. The material utilized will be selected to have a Rockwell hardness in the range from about $R_c42$ to $R_c45$. Dimensions of the beam are not critical, and will be selected to be consistent with the material utilized and the force range being measured. Typically, the block will have a length of about 0.2 to 1.0 inches, typically being about 0.4 inches, a width in the range from about 0.5 to 0.05 inches, typically being about 0.1 inches, and a height in the range from about 0.1 to 0.5 inches, typically being about 0.17 inches. The axial passage 18 and transverse passage 30 will be formed first, usually by conventional drilling or by die sink electrode discharge machining (EDM). After forming passages 18 and 30, a third passage or hole (not illustrated) is formed through the block at the desired location of receptacle 20. A wire electrode is then placed through the hole and used in EDM formation of the cut 40. Cut 40 will define a pair of hinge sections 44 and 46 which in turn define the areas of maximum tension 36 and compression 38, as discussed hereinabove.

After forming cut 40 and receptacle 20, an immobilization pin 50 (FIG. 6) will be inserted through axial passage 18 and into receptacle 20. The diameter of leading end 51 of the immobilization pin 50 is selected to conform to that of the annular sholder 26 of receptacle 20. The pin 50 is thus able to hold the deflectable element 14 in place during subsequent fabrication operations, including polishing and deposition of a Wheatstone bridge circuit 52 on the upper surface 34 of the beam 10. Without the immobilization pin 50, the stress of the fabrication operations would likely overstress deflectable element 14, potentially damaging the thinned hinge sections 44 and 46. Use of the immobilization pin 50, in contrast, allows very thin hinge sections 44 and 46, which in turn provide for highly sensitive and accurate force determination.

After fabrication is complete, the immobilization pin 50 is removed and replaced by limit pin 16, as previously described. Referring again to FIGS. 2 and 3, the limit pin 16 is axially positioned to allow for a desired lateral deflection of the deflectable element 14. The desired lateral deflection will depend on the "stiffness" of the deflectable element 14, the desired force measurement range, the elasticity of the block material, and the like. Typically, the desired deflection will be in the range from about 0.0001 to 0.01 inches, usually being about 0.001 to 0.005 inches, typically being about 0.003 inches.

When the deflectable element 14 is in its unstressed or neutral state, the conical head of limit pin 16 will lie in the center of receptacle 20, as illustrated in FIG. 2. When a force is applied to link 32, however, the deflectable element 14 will be caused to move upward relative to the remainder of block 12. As illustrated in FIG. 3, however, such upward travel is limited by the presence of the limit pin 16 which engages wall 24 of receptacle 20 at a preselected deflection. The amount of deflection, of course, is precisely determined by the axial position of the limit pin 16. Moving pin 16 to the left decreases the allowed deflection, while moving pin 16 to the right increases the allowed deflection.

An alternate embodiment of the limit pin 16 (designated 16') is illustrated in FIG. 4. Limit pin 16' includes a region 60 of reduced diameter at the end which is inserted into the deflectable element 14'. The region of reduced diameter 60 has a precisely controlled diameter which is intended to allow for an exact amount of relative motion with cylindrical notch 20' which is formed in the deflectable element 14'. Thus, the embodiment of FIG. 4 allows for highly accurate control of deflection. Adjusting the degree of deflection, however, requires insertion of a limit pin having a different reduced diameter, rather than mere axial adjustment of a single limit pin.

An alternate construction of the deflectable element 14'' is illustrated in FIG. 5. There, the hinge sections 44' and 46' are separated by a much larger distance than in the embodiment of FIG. 1. Operation of the beam 10'', however, will be substantially the same.

Referring now to FIG. 7, use of the deflector beam 10 in a pressure transducer assembly 70 will be described. Pressure transducer assembly 70 includes a housing 72 having a pressure port 74 therein. A diaphragm 76 is mounted to receive pressure through port 74 on one side thereof. The diaphragm is connected to link member 32, and block 10 is secured to a mounting member 78. Thus, an increase in pressure on diaphragm 76 causes link member 32 to move to the right, as illustrated in FIG. 6. Such motion, in turn, causes deflectable element 14 to move upward (as illustrated in FIGS. 1–3), causing the S-shaped deformation described earlier. The Wheatstone bridge 52 is connected to conventional detection circuitry, and the system may be calibrated in standard pressure units.

Although the foregoing invention has been described in some detail by way of illustration and example for purposes of clarity of understanding, it will be obvious that certain changes and modifications may be practiced within the scope of the appended claims.

What is claimed is:

1. An improved deflector beam of the type including a block, a deflectable element formed integrally within the block, and means for detecting deformation of the block resulting from a force applied to the deflectable element, said improvement comprising means on the block for selectively limiting motion of the deflectable element relative to the block wherein said means for limiting the motion of the deflectable element is adjustable over a range of deflections.

2. An improved deflector beam as in claim 1, wherein the means for selectively limiting the motion comprises a limit pin passing through the body and received by a receptacle in the deflectable beam.

3. An improved deflector beam as in claim 2, wherein the distal end of the limit pin is conical and the receptacle has a complementary conical shape, so that the deflection limits are set by axially positioning the pin within the receptacle.

4. A pressure transducer comprising:
   a frame;
   a deflector beam mounted on the frame, said deflector beam comprising a block and a deflectable element formed integrally within the block, said block having a passage therethrough and said deflectable element having a receptacle aligned with the passage;
   a limit pin received by the passage and receptacle, said pin being axially adjustable within the passage and having a preselected geometry such that maximum lateral deflection of the deflectable element may be adjusted by axially positioning the pin;
   a pressure-responsive diaphragm mounted on the frame;
   a link between the diaphragm and the deflectable element of the deflector beam; and
   means for detecting deformation of the block resulting from pressure changes on the diaphragm.

5. A pressure transducer as in claim 4, wherein the limit pin has a conical head and the receptacle is a complementary conical shape, so that deflection limits are set by axially positioning the pin within the receptacle.

6. A pressure transducer as in claim 4, wherein the limit pin is threadily received by the passage in the block.

7. A pressure transducer as in claim 4, wherein the means for detecting deformation of the block is a Wheatstone bridge circuit formed on the block.

8. A method for fabricating a deflector beam, said method comprising:
   forming a deflectable element within a block;
   forming a passage within the block;
   forming a receptacle in the deflectable element aligned within the passage in the block;
   placing an immobilization pin into the passage and engaging the receptacle to immobilize the deflectable element relative to the block;
   finishing the outer surfaces of the block; and
   forming a circuitry on the block to measure deformation.

9. A method as in claim 8, wherein the block is metal and the deflectable element is formed by wire electrode discharge machining.

10. A method as in claim 8, wherein the passage is formed by drilling a single hole in the block prior to forming the deflectable element.

11. A method as in claim 8, wherein the circuitry is a Wheatstone bridge.

* * * * *